May 6, 1958 F. P. MARTIN 2,833,362
HYDRAULICALLY DRIVEN MOTOR VEHICLE
Filed May 26, 1954 3 Sheets-Sheet 2
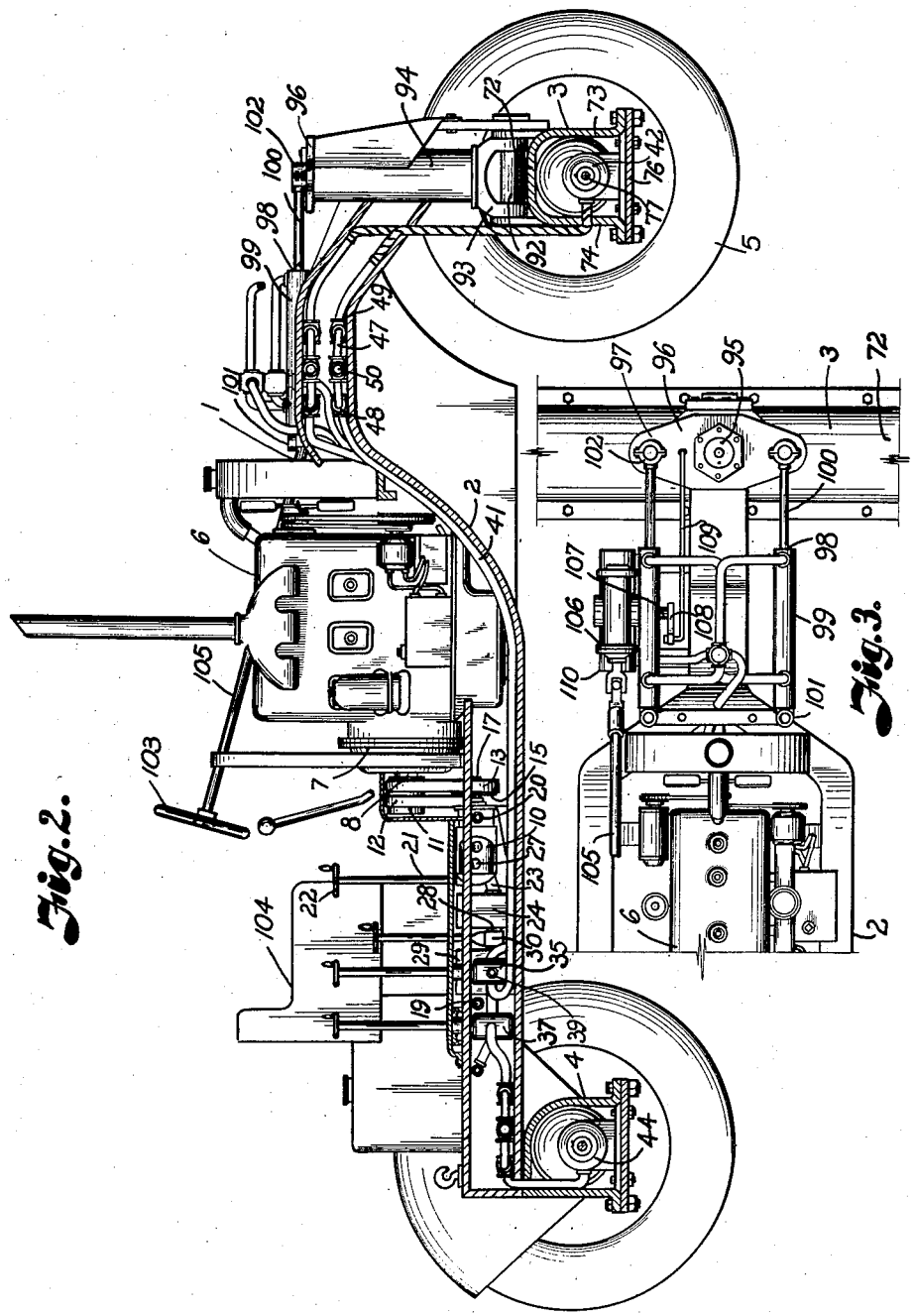
INVENTOR.
BY Fred P. Martin.
Fishburn & Mullendore
ATTORNEYS.

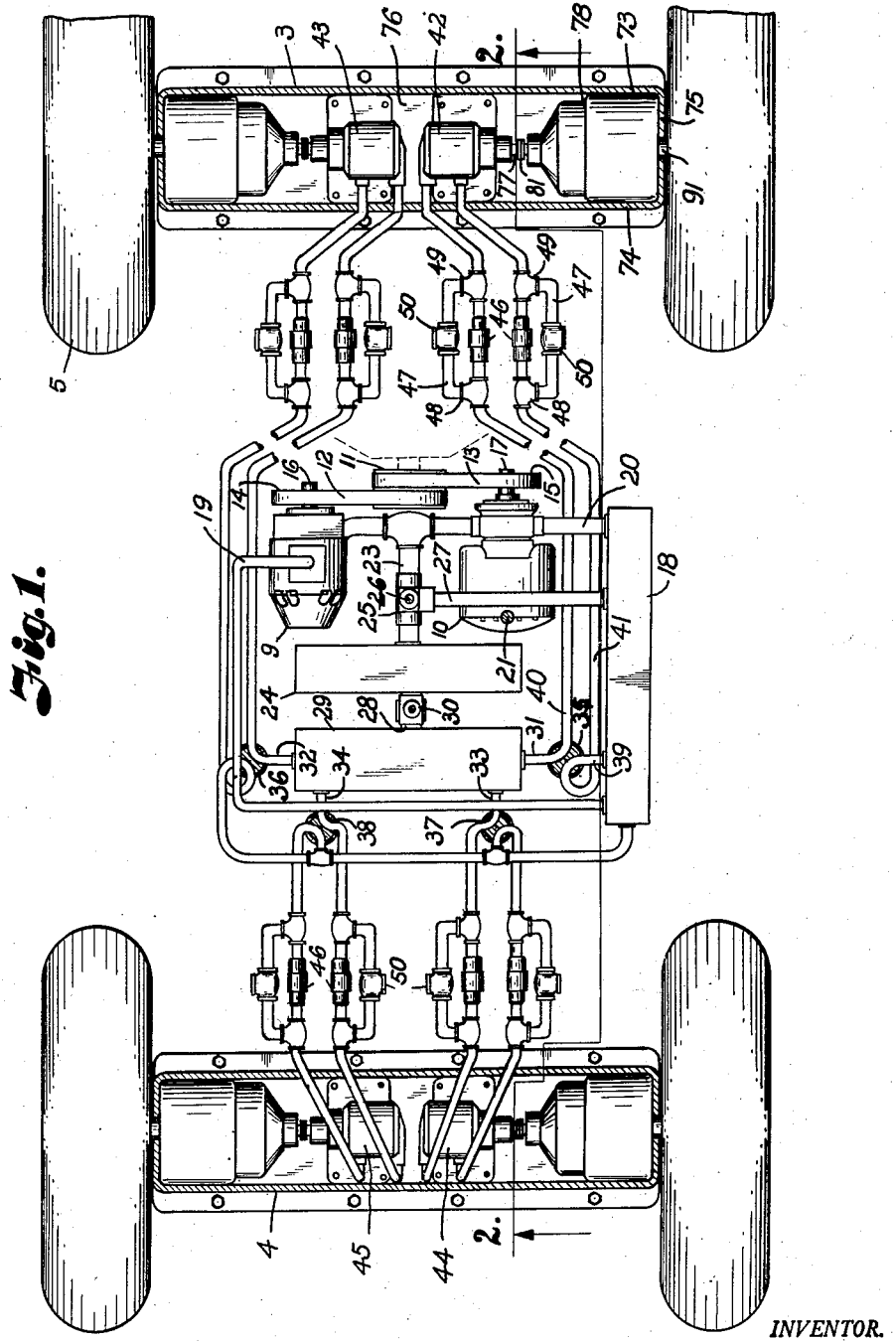

May 6, 1958 F. P. MARTIN 2,833,362
HYDRAULICALLY DRIVEN MOTOR VEHICLE
Filed May 26, 1954 3 Sheets-Sheet 3
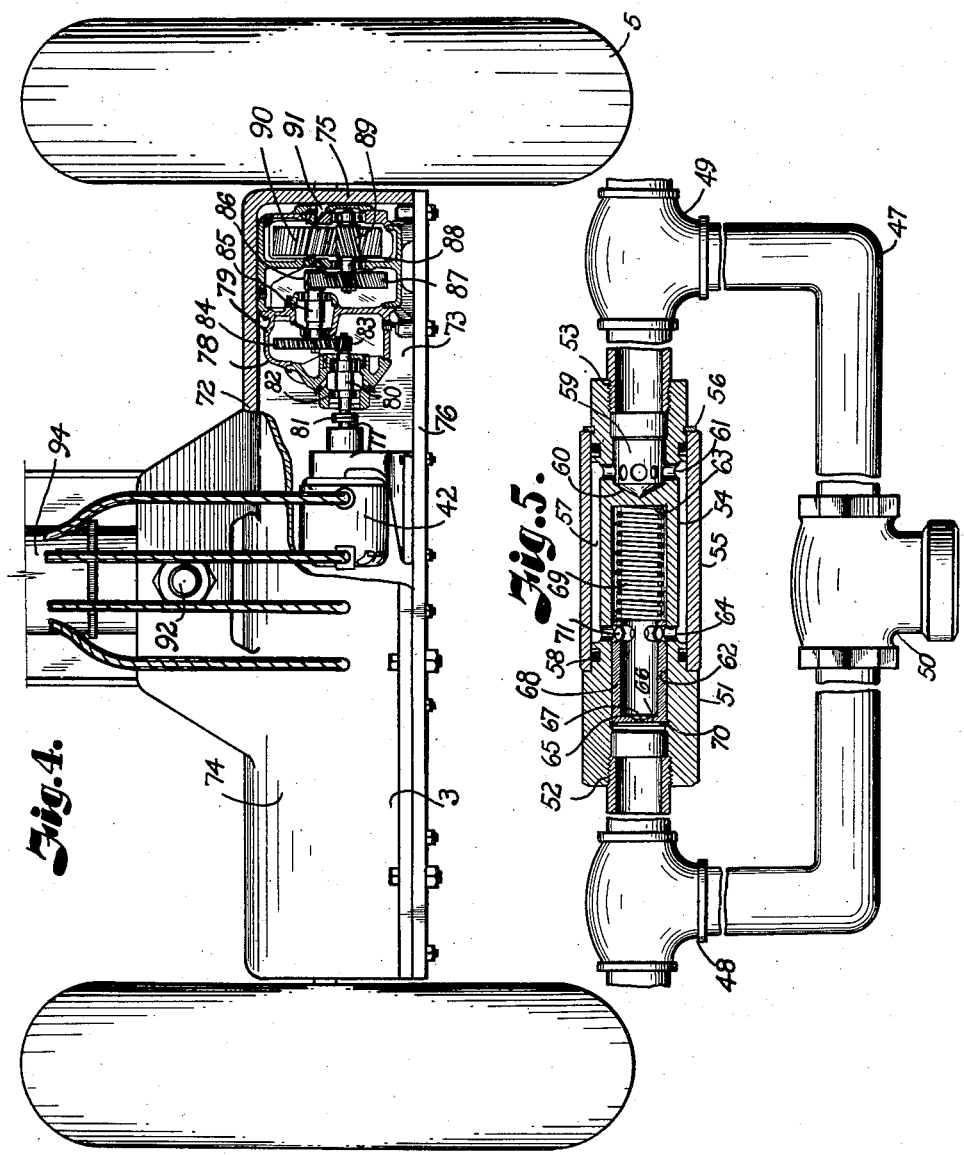
INVENTOR.
Fred P. Martin.
BY
Fishburn & Mullendore
ATTORNEYS.

United States Patent Office 2,833,362
Patented May 6, 1958

2,833,362

HYDRAULICALLY DRIVEN MOTOR VEHICLE

Fred P. Martin, Topeka, Kans.

Application May 26, 1954, Serial No. 432,385

3 Claims. (Cl. 180—66)

This invention relates to motor vehicles and more particularly to improvements in power transmission arrangements therein.

The objects of the present invention are to provide a power transmission mechanism in motor vehicles in which the wheels of the vehicle are driven independently of each other by reversible hydraulic motors and speed reduction mechanism mounted in the axle supported by the wheels and operated for obtaining various forward and reverse speeds and braking of the wheels; to provide such a drive mechanism wherein the speeds of the vehicle drive wheels is varied both by change of speed of the power plant and control of flow of fluid pressure to the wheel driving motors; to provide such a drive mechanism wherein a supply of driving fluid is substantially maintained at a desired pressure and is replenished as it is used for operating the wheel driving motors; to provide such a drive mechanism with flow regulators in the supply line to each wheel driving motor whereby the relative rotation of selected wheels is substantially the same under variable loads to prevent spinning of a wheel when the friction between said wheel and the surface engaged thereby is materially less than that of another wheel; and to provide an hydraulically driven motor vehicle which is relatively economical to manufacture and operate and that will provide a substantially positive hydraulic drive to any or all wheels of the vehicle.

In accomplishing these and other objects of the present invention, I have provided improved details of structure the preferred forms of which are illustrated in the accompanying drawings, wherein:

Fig. 1 is a diagrammatical plan view of a vehicle incorporating the hydraulic mechanism.

Fig. 2 is a vertical sectional view through the vehicle on the line 2—2, Fig. 1.

Fig. 3 is a partial plan view illustrating mechanism for steering one of the axles.

Fig. 4 is a rear elevation of the front axle with portions broken away to illustrate the speed reduction mechanism between one of the driving motors and the respective wheel.

Fig. 5 is a plan view of a fluid supply line and by-pass therein, portions being broken away to show the structure of a flow regulator in the line.

Referring more in detail to the drawings:

1 designates a motor vehicle, such as a tractor, having a frame 2, front and rear axle housings 3 and 4 respectively and traction wheels 5 supporting said axle housings. A power plant such as an internal combustion engine 6 is suitably mounted on the frame and is provided with a clutch housing 7 at one end thereof having a driven shaft 8 extending from said clutch housing. The shaft 8 is operatively connected with fluid pumps 9 and 10 for driving same. In the illustrated structure a pulley 11 is fixed on the shaft 8 and engaged by belts 12 and 13 which drivingly engage pulleys 14 and 15 respectively fixed to shafts 16 and 17 of the pumps 9 and 10 respectively.

The pump 9 receives hydraulic fluid from a reservoir 18 through an intake line 19 and the pump 10 receives hydraulic fluid from the reservoir 18 through an intake line 20. The pump 9 is preferably a constant volume type, such as a vane pump and the pump 10 is preferably of a variable volume type provided with a stem 21 rotated by a wheel 22 for varying the volume delivered by said pump 10. The pumps 9 and 10 each discharge into a line 23 which is connected to a pressure tank 24.

An adjustable relief valve 25 is arranged in the line 23 and is regulated by a control 26 to the desired maximum pressure in the tank 24. When the maximum pressure in the tank 24 is reached, the relief valve opens and excess fluid pressure passes through a line 27 to the reservoir 18. It is preferable that the relief valve 25 be set to open at pressures from 1500 to 2000 pounds per square inch and therefore it is desirable that the pumps 9 and 10 be of a type capable of providing a high delivery at approximately 2000 pounds per square inch in continuous duty operation.

The variable volume pump 10 is preferably of a type having a suitable controlled compensator whereby when the pump is operating at a pressure less than the maximum setting of the compensator, the pump delivers full volume. When the compensator pressure setting is reached the volume is automatically reduced to the amount of flow required to maintain the pressure throughout the working system. This type of operation provides a saving in the power required to drive the variable volume pump in that the power need only be sufficient to maintain the high pressure at minimum volume or the maximum volume at low pressure whichever is greater. Such pumps are conventional equipment available on the market. Due to the operating characteristics of the variable volume pump 10 it is desirable that the relief valve 25 be set at a pressure slightly higher than the pressure setting of the pump compensator so that the compensator will act to first reduce the delivery of the variable pump 10 to a minimum required to maintain the pressure in the system and then if the constant volume pump 9 is still delivering more fluid than is required in the system, the relief valve 25 will open to by-pass the excess delivery to the supply tank 18.

The high pressure tank 24 is connected by a line 28 to a manifold tank 29, a control valve 30 being arranged in the line 28 to control communication between the pressure tank 24 and manifold tank 29 and serves as a single stop and start control for the vehicle because when it is open fluid pressure is supplied to the system and when it is closed fluid pressure to the system is shut off. It is preferable that each wheel of the vehicle be individually driven and since, in the illustrated structure, the vehicle has four wheels there are four conduits 31, 32, 33 and 34 providing communication from the manifold tank 29 to reversing valves 35, 36, 37, and 38 respectively, the valves 35 and 36 controlling operation of the right and left front wheels respectively and the valves 37 and 38 controlling operation of the right and left rear wheels respectively.

The fluid connections and driving mechanism for the individual wheels are preferably substantially identical and therefore will be described specifically only in connection with the arrangement for driving the right front wheel. The valve 35 is illustrated as a four-way valve having one port connected by a conduit 31 to the manifold tank 29 and an opposite port connected by a conduit 39 to the supply tank 18. The other opposite ports are connected by conduits 40 and 41 to provide communication to an hydraulic motor 42 suitably mounted in the front axle housing 3. A similar motor 43 is also mounted in the front axle housing driving the left front wheel and hydraulic motors 44 and 45 are suitably mounted in rear axle housing 4 for driving the right and left rear wheels respectively. Each of the motors 42, 43, 44 and 45 are of a reversible type whereby supply of high pressure fluid for movement through the motor in one direction will operate the motor for forward movement of the vehicle and reversing the direction of flow of fluid through the motor will provide the same power for operation of the motor in the opposite direction for reverse motion of the vehicle.

An automatic flow regulator 46, as illustrated in Fig. 5, is arranged in each of the conduits 40 and 41 to automatically regulate flow of fluid in the conduit toward the motor. Flow of fluid from the motor in either conduit is preferably not regulated as it is desirable that there be as little resistance as possible to flow through the conduit when acting as a low pressure side of the hydraulic motor system. Therefore a by-pass line 47 has its ends communicating as at 48 and 49 with the conduit 40 at opposite ends of the regulator 46 and a similar by-pass line 47 has its ends connected as at 48 and 49, with the conduit 41 at opposite ends of the regulator 46 therein. Check valves 50 are arranged in each of the by-pass lines 47 in such a manner that they operate to stop flow of fluid through the by-pass line toward the hydraulic motor and open for substantially free flow of the fluid through the by-pass line 47 when the direction of fluid flow therein is away from the hydraulic motor.

Each of the regulators 46 consist of an elongated housing 51 having one end connected as at 52 to the portion of the conduit leading to the reversing valve 35 and the other end connected as at 53 to the portion of the conduit leading to the hydraulic motor 42. The housing 51 is provided intermediate the end thereof with a portion 54 of reduced size which is enclosed by a sleeve 55 which is suitably secured on the housing as by a retainer 56. The sleeve 55 and the reduced portion 54 cooperate to provide a passage 57 therebetween and suitable seals 58 are arranged between the housing and sleeve at the end of the passage to form a pressure tight connection. The end of the housing 51 toward the hydraulic motor has a bore 59 communicating with the conduit leading to the hydraulic motor, said bore 59 terminating as at 60 and having communication through a plurality of ports 61 with the adjacent end of the passage 57. The other end of the housing is provided with bore 62 which terminates as at 63 in spaced relation to the bore 59, said bore 62 communicating with the conduit leading to the control valve 35. A plurality of ports 64 provide communication between the passage 57 and the bore 62. A piston 65 is slidably mounted in the bore 62 and has a head 66 at the end toward the reversing valve provided with a suitable orifice 67 therein. The piston has a skirt 68 that extends beyond the port 64. A spring 69 has one end engaging the end of the bore 62 and the other end engaging the skirt of the piston to urge the piston whereby the head thereof normally engages a stop 70. The skirt of the piston has a plurality of ports 71 which register with the ports 64 when the head of the piston is in engagement with the stop 70. The orifice 67 is of such size that at normal operating pressures and flow the spring 69 will maintain the head of the piston in engagement with the stop 70 but as pressure required for the operation of the hydraulic motor is reduced, the fluid pressure in the conduit from the reversing valve will overcome the spring pressure whereby the piston will be moved away from the stop 70 gradually moving the ports 71 and 64 out of registry whereby the flow through the regulator will be reduced. With this arrangement the flow regulators function to automatically maintain the same flow to each of the hydraulic motors and thereby prevent one wheel spinning while the other wheels are substantially stationary. For example if one wheel is on ice or other surface providing substantially no traction for the wheel while the other wheels are on dry surfaces with ample traction, there would be a tendency for the wheel on the ice to spin and the motor driving same to take an excessive proportion of the fluid pressure whereby there would be insufficient power to drive the other hydraulic motors. With the flow regulators the pressure flow to the respective motors is automatically regulated so each has its proper proportion of the power available whereby the wheels having suitable traction will move the vehicle.

Each of the axles 3 and 4 are preferably elongated hollow housings extending transversely of the vehicle. In the illustrated structure the housings have top walls 72, front walls 73, rear walls 74 and end walls 75 with the bottom closed by a plate 76 suitably secured to the front and rear walls, however any of the walls could be formed with a removable plate for access to the interior of the housing and the bottom wall could be integral with the remainder of the housing.

Each of the hydraulic motors 42, 43, 44 and 45 are arranged in the respective axle housings and suitably secured to a wall thereof with the driven shaft 77 of the motor extending toward the wheel to be driven thereby. A suitable speed reduction unit 78 is arranged in the respective axle housing between the respective hydraulic motor and the end wall of the axle housing adjacent the wheel to be driven thereby. It is desirable that the speed reduction unit be such that it will provide a relatively large speed reduction between the hydraulic motor and the wheel, for example on the order of 75 to 1. In the illustrated structure the speed reduction units 78 each have a housing 79 with an input shaft 80 suitably connected as by couplings 81 with the motor shaft 77. The input shaft is preferably rotatably mounted in the housing 79 by anti-friction bearings 82 and carries a small gear 83 which meshes with a relatively large gear 84 fixed on a shaft 85. The shaft 85 is also suitably supported in the housing by anti-friction bearings and carries a small gear 86 which meshes with a relatively large gear 87 on a shaft 88. The shaft 88 is preferably supported in the housing by anti-friction bearings adjacent the end opposite the input shaft and carries a small gear 89 which meshes with a large gear 90 fixed on a shaft 91 suitably supported by anti-friction bearings and having a portion extending through the adjacent end wall of the axle housing, the extending portion of the shaft 91 carrying the vehicle wheel to be driven thereby, said wheel being suitaby fixed to the said extending portion of the shaft. Each of the gears in the speed reduction unit is illustrated as being helical, however herringbone or other suitable gear teeth may be utilized.

In the illustrated structure the rear axle housing 4 is fixed to the frame 2. The front axle housing 3 is mounted for oscillation about a pin 92 that is supported by a yoke 93 which is carried by a housing 94 fixed to the forward end of the frame 2. The yoke 93 has a shank 95 that is rotatably mounted in the housing 94 for rotation about a vertical axis. The shank 95 extends upwardly above the housing 94 and has fixed on the upper end thereof a steering member 96 which has outwardly extending arms 97. Extensible hydraulic jacks 98 having cylinders 99 and piston rods 100 extending therefrom are arranged with one end of each jack pivotally mounted as at 101 to the frame 2 in rearwardly spaced relation to the steering member 96. The other end of the jacks are pivotally connected as at 102 to the oppositely extending arms 97 of the steering member 96. A steering wheel 103 is arranged adjacent an operator's seat 104 and is connected by a shaft 105 to a steering gear mechanism 106 arranged to rotate a shaft 107 in response to turning of the steering wheel 103. A crank arm 108 is fixed on a shaft 107 and is connected by a link 109 to the steering member 96. Operation of the steering gear 106 by the steering wheel 103 controls supply of fluid under pressure to a booster cylinder 110 to apply fluid pressure to the cylinders 99 whereby rotation of the steering wheel 103 to the right will cause the steering gear 106 to control the application of fluid pressure to the cylinders 99 whereby said hydraulic jacks 98 swing the steering member 96 and also the axle housing 3 for a right hand turn. Link 109, crank arm 108 and shaft 107 provide a direct connection from the steering member 96 to the steering gear 106 whereby the axle is swung only to the extent determined by the turning of the steering wheel 103 and the gear ratio in the steering gear 106. This provides the operator with the proper feel of the steering while the power for swinging the axle 3 is imparted by the hydraulic jacks 98.

In operating a vehicle having a drive mechanism constructed and assembled as described, the valve 30 is shut off to prevent flow of fluid pressure to the hydraulic motors. Then the engine 6 is started and the clutch operated whereby the engine drives the pumps 9 and 10 and the pumps supply fluid under pressure to the pressure tank 24 until the pressure reaches the setting of the compensator for the pump 10. Then the delivery of the pump 10 is reduced to a minimum. The pump 9 continues to deliver fluid under pressure until the pressure in the tank 24 reaches the pressure of the setting of the relief valve 25 which then opens whereby the fluid delivered by the pump 9 is by-passed through the line 27 to the supply tank 18 and the operation of the pumps merely maintain pressure in the pressure tank 24.

If a straight forward motion is desired the valves 35, 36, 37 and 38 are all turned as illustrated in Fig. 1 to provide communication between the manifold tank 29 and the conduits 40 and communication between the conduits 41 and the lines leading to the supply tank 18. Then the valve 30 is opened whereby the fluid under pressure is delivered to the manifold tank 29 and through the conduits 40, flow regulator 46 therein to the respective motors in the axle housing to drive the motors, the return flow from the motors flowing through the by-pass line 47, check valve 50 and conduits 41 to the respective valves and then to the supply tank. This drives the motors which through the shafts 77 drive the speed reducers 78 which in turn drive the respective wheels rotating same in the direction to provide forward motion for the vehicle. When reverse motion is desired, the valves 35, 36, 37 and 38 are turned whereby the flow from the conduits 31, 32, 33 and 34 is connected with the conduits 41 and the conduits 40 are connected with the lines 39. Then the fluid under pressure flows from the manifold tank 29 through the conduits 41, flow regulators 46 to the respective hydraulic motors. The return flow is through the by-pass line 47, check valves 50 and conduits 40 to the respective valve and then through the lines 39 to the supply tank 18. The direction of flow of fluid through the motors is then opposite to that described for imparting forward motion to the wheels.

Any one of any number of the wheels may be individually operated or operated collectively as desired. For example the wheels on one side of the vehicle may be driven for forward movement of the vehicle while the wheels on the other side of the vehicle may be driven in a reverse direction or held stationary as desired. This is believed particularly advantageous in connection with the operation of the front wheels to aid in turning of the vehicle. Also the valves 35, 36, 37 and 38 may be moved to a neutral position to stop flow through any of the conduits and thereby serve as a brake to hold the vehicle or selected wheels stationary. While the valves 35, 36, 37 and 38 are shown as four-way valves, whereby one valve is used for control of the operation of each wheel, it is obvious that separate valves may be used for controlled flow of fluid through each of the conduits 40 and 41 and also the valves may be connected in multiples by means of levers or other controls for simultaneous operation of the valves. Many other embodiments of the invention may be resorted to without departing from the spirit of the invention.

It is believed obvious that I have provided a fluid drive for vehicles that is positive and efficient in operation, that provides a flexibility of control of the drive of the individual wheels whereby all or any desired groups of wheels may be driven as desired with suitable speed reduction between the individual hydraulic motors and the wheels with positive steering of the vehicle.

What I claim and desire to secure by Letters Patent is:

1. A fluid transmission system for vehicles comprising, a source of fluid pressure including a fluid supply tank, a variable speed prime mover, a pump having an inlet communicating with the fluid supply tank and operatively connected with the prime mover to be driven thereby, a pressure tank for receiving the delivery of said pump, an hydraulic motor for each wheel of a vehicle and operatively connected with the respective wheels of said vehicle, conduits connecting the pressure tank with the inlet side of the hydraulic motors, other conduits connecting the outlet side of the hydraulic motors with the supply tank to form return conduits, valve means in the conduits for selectively controlling flow of fluid from the pump output through the inlet conduits to the motors for causing forward movement of the vehicle, means in the conduit valves for causing reversal of flow of fluid in the inlet and return conduits for causing the motors to drive the vehicle rearwardly, flow regulators in each of the conduits for effecting substantially uniform flow of fluid to the motor inlets, and by-pass means having flow checks therein for by-passing the flow regulators in the return conduits.

2. A fluid transmission system for vehicles comprising, a source of fluid pressure including a fluid supply tank, a variable speed prime mover, a constant volume pump and a variable volume pump each having an inlet communicating with the fluid supply tank and operatively connected with the prime mover to be driven thereby, a pressure tank for receiving the delivery of said pumps, pressure responsive means for returning fluid to the supply tank when pressure in the pressure tank is more than the predetermined operating pressure, an hydraulic motor for each wheel of a vehicle and operatively connected with the respective wheels of said vehicle, conduits connecting the pressure tank with the inlet side of the hydraulic motors, other conduits connecting the outlet side of the hydraulic motors with the supply tank to form return conduits, valve means in the conduits for selectively controlling flow of fluid from the pressure tank through the inlet conduits to the motors for causing forward movement of the vehicle, means in the conduit valves for causing reversal of flow of fluid in the inlet and return conduits for causing the motors to drive the vehicle rearwardly, flow regulators in each of the conduits for effecting substantially uniform flow of fluid to the motor inlets, and by-pass means having flow checks therein for by-passing the flow regulators in the return conduits.

3. A fluid transmission system for vehicles comprising a source of fluid pressure including a fluid supply tank, a variable speed prime mover, a constant volume pump and a variable volume pump each having an inlet communicating with the fluid supply tank and operatively connected with the prime mover to be driven thereby, a pressure tank for receiving the delivery of said pumps, pressure responsive means for returning fluid to the supply tank when pressure in the pressure tank is more than the predetermined operating pressure, an hydraulic motor for each wheel of a vehicle and operatively connected with the respective wheels of said vehicle, a manifold tank, means connecting the pressure tank with the manifold tank including a valve for controlling flow of fluid to the manifold tank, conduits connecting the manifold tank with the inlet side of the hydraulic motors, other conduits connecting the outlet side of the hydraulic motors with the supply tank to form return conduits, valve means in the conduits for selectively controlling flow of fluid from the manifold tank through the inlet conduits to the motors for causing forward movement of the vehicle, means in the conduit valves for causing reversal of flow of fluid in the inlet and return conduits for causing the motors to drive the vehicle rearwardly, flow regulators in each of the conduits for effecting substantially uniform flow of fluid to the motor inlets, and by-pass means having flow checks therein for by-passing the flow regulators in the return conduits.

References Cited in the file of this patent

UNITED STATES PATENTS

| | | | |
|---|---|---|---|
| 832,518 | Wolcott | Oct. 2, | 1906 |
| 958,212 | Baab | May 17, | 1910 |
| 1,831,983 | Wheeler | Nov. 17, | 1931 |
| 1,903,380 | Talboys | Apr. 4, | 1933 |
| 1,963,091 | Jenkins | June 19, | 1934 |
| 2,228,411 | Sheridan | Jan. 14, | 1941 |
| 2,365,095 | Miller et al. | Dec. 12, | 1944 |
| 2,384,447 | Baldwin et al. | Sept. 11, | 1945 |
| 2,431,719 | Wilkin | Dec. 2, | 1947 |
| 2,446,242 | Orshansky, Jr. | Aug. 3, | 1948 |
| 2,625,231 | Martin | Jan. 13, | 1953 |